G. A. TAFLIN.
CURRYCOMB AND MANE COMB.
APPLICATION FILED MAR. 29, 1916.
1,249,552.
Patented Dec. 11, 1917.
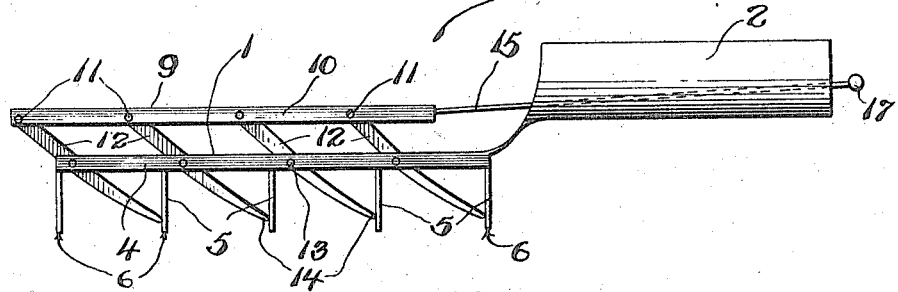
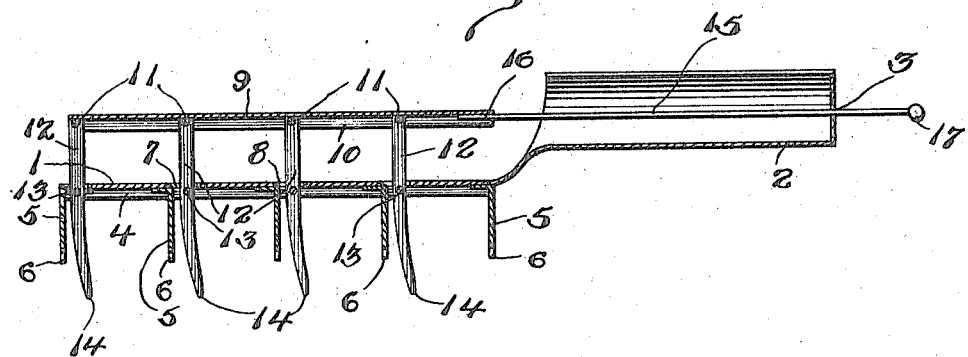
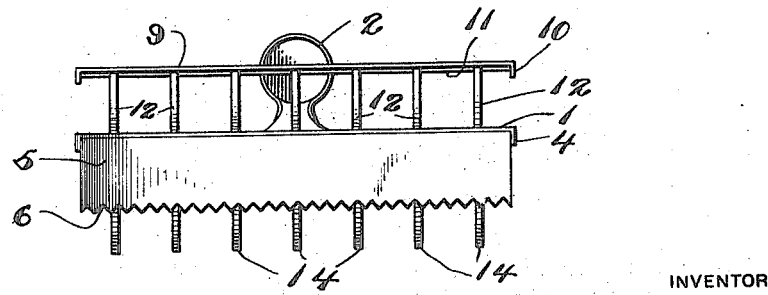

UNITED STATES PATENT OFFICE.

GUSTAF A. TAFLIN, OF McINTOSH, MINNESOTA.

CURRYCOMB AND MANE-COMB.

1,249,552.   Specification of Letters Patent.   Patented Dec. 11, 1917.

Application filed March 29, 1916. Serial No. 87,531.

*To all whom it may concern:*

Be it known that I, GUSTAF A. TAFLIN, a citizen of the United States, residing at McIntosh, in the county of Polk and State of Minnesota, have invented certain new and useful Improvements in Currycombs and Mane-Combs, of which the following is a specification.

This invention relates broadly to animal husbandry and more particularly to a combined curry comb and mane comb.

The primary object of this invention resides in the provision of a device of the above character embodying coöperating mane combing and currying means so arranged that when the mane combing means is being operated the currying means will also engage that part of the mane previously engaged by the mane combing means whereby to efficiently comb the mane, the mane combing means incidentally being movable into an inoperative position, at times, to lie within and behind the currying means to permit of the expeditious operation of this latter means.

It is a more specific object of this invention to provide a main curry comb supporting plate with a handle, mane combing teeth being pivotally connected intermediate their ends to the main plate and adapted to lie within the curry combing means, to slidably mount a rod in the handle and rigidly connect it to the supporting plate of the mane combing teeth so that when the rod is pulled outwardly the mane combing teeth will move about their pivot and extend beyond the plane of the outer edge of the currying means.

A still further object of my invention resides in the provision of a device of the character described that is simple in construction, efficient in operation and one that can be manufactured and placed on the market at a minimum cost.

Other objects as well as the nature, characteristic features and scope of my invention will be more readily understood from the following description taken in connection with the accompanying drawings and pointed out in the claims forming a part of this specification.

In the drawings:—

Figure 1 is a side elevation of this invention;

Fig. 2 is a longitudinal section thereof; and

Fig. 3 is a front end elevation thereof.

Referring more particularly to the drawings I provide a main supporting plate 1 from one end of which extends a tubular handle 2 having an opening 3 in the closed end thereof to provide a guide for a purpose to be described. The longitudinal edges of the plate are bent downwardly to provide flanges 4. A plurality of flanges 5 are transversely connected to the under surface of the plate at uniformly spaced intervals throughout its length, the lower edges of the said flanges being serrated to provide currying teeth 6. The plate 1 is further provided with a plurality of transversely extending slots positioned in the rear of the flanges 5 and having one of their edges in alinement with the rear edges of the said flanges, the said alining edges of the slots being beveled as indicated by the numeral 8 for a purpose to be hereinafter described.

Coöperating with the currying means is my improved mane combing means in the present instance comprising a rectangular plate 9 having the longitudinal edges bent downwardly to provide supporting flanges 10. Rotatably mounted in these flanges are a plurality of transversely extending teeth supporting rods 11, on uniformly spaced intervals of which are rigidly connected a plurality of main combing teeth 12. These rows of teeth each have their intermediate portions engaged by another rod 13, the respective ends of which latter are rotatably mounted in the flanges 4. The free ends of the teeth terminate in points 14. The teeth are normally arranged so that their outer edges rest upon the beveled edges 8 of the slot 7 and so that the other pointed ends 14 are arranged to abut the adjacent currying flanges above the currying teeth 6 whereby to allow the expeditious use of the curry comb in its usual capacity.

In order to move the mane combing means so that the pointed ends 14 of the teeth will extend beyond the plane of the outer edges of the curry teeth 6 I have provided a rod 15, one end of which is slidably mounted in the guiding opening 3 in the handle 2, the inner end of the rod being rigidly connected as at 16 to the plate 9. An operating knob 17 is formed on the outer end of the rod 15.

It is thought to be understood that by pulling the knob from the handle 2 the rods 13 will move about their pivots to place the teeth 12 in an extended position while it is only necessary to push the rod 15 inwardly and allow the rods 13 and 11 to move about their pivots to return the teeth within the plane of the outer edges of the currying teeth and behind the flanges.

Although I have shown and described the preferred embodiment of my invention I desire to be understood that I am not to be limited to the exact details shown. However, I desire that great stress be laid upon the arrangement of the mane combing means associated with the curry comb in such a manner that when the mane combing means is being operated the teeth of the curry comb will also engage that part of the mane that has been engaged by the mane combing means, whereby an expeditious cleaning and currying is obtained.

From the above description taken in connection with the accompanying drawings, it can easily be seen that I have provided a device that is simple in construction, containing but a few simple parts that can be cheaply manufactured and assembled and when assembled can be placed upon the market and sold at a minimum cost.

It will be understood that the above description and accompanying drawings comprehend only the general embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent; is—

1. A device of the character described including in combination with a plate for supporting curry combing teeth, a plurality of mane combing teeth, a plurality of rods carrying a plurality of the mane combing teeth and having their respective ends rotatably mounted, the free ends of the mane combing teeth being normally between the currying teeth, and means associated with the mane combing teeth for moving them so that their lower ends will be projected beneath the outer edges of the currying teeth.

2. A device of the character described including in combination with a main plate provided with a plurality of transverse slots, a handle extending from the plate and provided with a guiding opening, a plurality of mane combing teeth, a plurality of rods connected to the mane combing teeth approximately intermediate the ends of the mane combing teeth and having the respective ends thereof rotatably associated with the main plate, a secondary plate pivotally associated with the upper ends of the teeth, a rod extending from the secondary plate and slidably mounted in the guiding opening, so that when the rod is moved the teeth will be projected or retracted.

3. A device of the character described, the combination with currying means, of mane combing means comprising a plurality of teeth pivotally mounted in the currying means, said teeth being connected together at one end, and manual means operative to project and retract the teeth.

4. A device of the character described, the combination with currying means, of mane combing means comprising a plurality of teeth pivotally mounted on the currying means, said teeth being connected together at one end by an operating bar, and a manually operative actuating rod connected to the bar for producing projection and retraction of the teeth to and from their operative position.

5. A mane combing device comprising a plurality of teeth pivotally mounted on a currying device, said teeth being spaced from each other both transversely and longitudinally, means to pivotally connect the ends of the teeth transversely and longitudinally, and means connected to said latter means for causing rotation of the teeth on their pivots and thereby the projection and retraction of the teeth, relative to their operative and inoperative position.

In testimony whereof I affix my signature in presence of two witnesses.

GUSTAF A. TAFLIN.

Witnesses:
 OLAF TAFLIN,
 CHAS. MARTIN.

Copies of this patent may be obtained for five cents each, by addressing the "Commissioner of Patents, Washington, D. C."